United States Patent
Li et al.

(10) Patent No.: US 10,253,261 B2
(45) Date of Patent: Apr. 9, 2019

(54) STIMULI-RESPONSIVE LIQUID CRYSTALLINE NETWORKS

(71) Applicants: UT-Battelle, LLC, Oak Ridge, TN (US); Washington State University, Pullman, WA (US)

(72) Inventors: Yuzhan Li, Pullman, WA (US); Orlando Rios, Knoxville, TN (US); Michael Richard Kessler, Pullman, WA (US)

(73) Assignees: UT-BATTELLE, LLC, Oak Ridge, TN (US); WASHINGTON STATE UNIVERSITY, Pullman, WA (US)

( * ) Notice: Subject to any disclaimer, the term of this patent is extended or adjusted under 35 U.S.C. 154(b) by 0 days.

(21) Appl. No.: 15/409,717

(22) Filed: Jan. 19, 2017

(65) Prior Publication Data

US 2017/0240811 A1    Aug. 24, 2017

Related U.S. Application Data

(60) Provisional application No. 62/280,189, filed on Jan. 19, 2016.

(51) Int. Cl.

| | |
|---|---|
| *G02F 1/1333* | (2006.01) |
| *C09K 19/38* | (2006.01) |
| *C08G 59/28* | (2006.01) |
| *C08G 59/42* | (2006.01) |
| *C08G 59/68* | (2006.01) |

(52) U.S. Cl.
CPC .......... *C09K 19/3814* (2013.01); *C08G 59/28* (2013.01); *C08G 59/4207* (2013.01); *C08G 59/686* (2013.01); *C08G 2280/00* (2013.01)

(58) Field of Classification Search
CPC ............... C09K 19/3814; C08G 59/28; C08G 59/4207; C08G 59/686; C08G 2280/00; G02F 1/1333
USPC .................................................. 252/299.68
See application file for complete search history.

(56) References Cited

U.S. PATENT DOCUMENTS

| | | | |
|---|---|---|---|
| 4,595,761 | A | 6/1986 | Chattha |
| 4,710,547 | A | 12/1987 | Uryu et al. |
| 5,393,644 | A | 2/1995 | Etzbach et al. |
| 5,629,381 | A | 5/1997 | Isozaki |
| 7,794,623 | B2 | 9/2010 | Matayabas, Jr. et al. |
| 2006/0054195 | A1 | 3/2006 | Yoon et al. |
| 2008/0258108 | A1 | 10/2008 | Broer et al. |
| 2009/0029058 | A1 | 1/2009 | Grasboeck et al. |
| 2011/0009521 | A1 | 1/2011 | Su et al. |

FOREIGN PATENT DOCUMENTS

| | | | |
|---|---|---|---|
| CN | 104072687 A | 10/2014 | |
| EP | 0 724 006 A1 * | 7/1996 | ............. C09K 19/54 |

OTHER PUBLICATIONS

International Search Report dated Apr. 10, 2017 issued in PCT/US2017/014074.

* cited by examiner

*Primary Examiner* — Geraldina Visconti
(74) *Attorney, Agent, or Firm* — Scully Scott Murphy & Presser

(57) ABSTRACT

Liquid crystalline network compositions comprising azo-containing aromatic epoxy units cross-linked with alkylene diacid units having alkylene segments containing at least one methylene unit, wherein the azo-containing aromatic epoxy units and alkylene diacid units are connected by ester linkages resulting from ring-opening esterification between the epoxy units and alkylene diacids, and wherein the azo-containing aromatic epoxy units and alkylene diacid units are in a molar ratio that results in the liquid crystalline network composition exhibiting a glass transition temperature ($T_g$) of at least 25° C. Methods for producing these compositions and their use in light- or thermal-activated physical deformation, shape memory applications, and self-healing, as well as their ability to be recycled and used in additive manufacturing processes are also described.

30 Claims, 25 Drawing Sheets

(4C)    (4D)

(4G) (4H)

STIMULI-RESPONSIVE LIQUID CRYSTALLINE NETWORKS

CROSS REFERENCE TO RELATED APPLICATION

The present application claims benefit of U.S. Provisional Application No. 62/280,189, filed on Jan. 19, 2016, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy, and Grant No. FA9550-12-1-0108 awarded by the Air Force Office of Scientific Research (USAF/AFOSR). The government has certain rights in the invention.

FIELD OF THE INVENTION

The present invention relates, generally, to liquid crystalline networks with stimuli-responsive, shape memory, and self-healing behaviors. The present invention more particularly relates to liquid crystalline compositions capable of light-stimulated mechanical deformation.

BACKGROUND OF THE INVENTION

Liquid crystalline networks (LCNs) are versatile functional materials because of the unique properties of the liquid crystalline (LC) molecules, e.g., self-organization, reversible phase transition, and macroscopic orientation under external fields. The coupling between LC molecules and polymer networks allows these remarkable properties to be transferred to the bulk material, which results in a number of functional LCNs that are thermally responsive and are able to change their shape reversibly upon temperature cycling Shape memory polymers (SMP) are smart materials that can recover their original shape from a deformed state under external stimuli. SMPs generally consist of cross-linked polymer networks that determine the permanent shape of the material, and switching segments that are capable of being oriented and solidified to fix a temporary shape. The shape recovery is driven by the entropic force of the switching domains, which tend to gain entropy and return to the random conformation during phase transitions, such as glass transition, liquid crystalline (LC) transition, and melting transition.

In recent years, using light to induce shape change in a material has received much interest. However, the currently known photoresponsive LCNs, such as those based on either polysiloxane or polyacrylate chemistry, are generally incapable of undergoing a reversible phase transition, thereby affecting the potential functionality of these materials. In addition, these siloxane and acrylate-based LCNs generally cannot be reprocessed because of their covalently fixed cross-linked structure, which makes it impossible to reshape or repair the material.

SUMMARY OF THE INVENTION

In one aspect, the invention is directed to liquid crystalline network (LCN) compositions resulting from cross-linking between azo-containing epoxy units and alkylene diacids containing at least one methylene unit. The epoxy-diacid chemistry endows the LCN compositions with the ability to undergo reversible phase transitions, while the presence of azo linkages advantageously endows the LCN compositions with the ability to undergo shape change by light stimulation. In combination, the LCN compositions described herein can undergo reversible shape changing by light activation, and even exhibit shape memory behavior by virtue of their ability to undergo thermally-induced liquid crystalline phase transitions, and self-healing behavior through exchangeable ester bonds.

By virtue of a glass transition temperature ($T_g$) of at least 25° C., the LCN compositions described herein can advantageously be reshaped or recycled and are particularly suited for use in additive manufacturing processes. The LCN compositions considered herein preferably exhibit a glass transition temperature ($T_g$) of at least 25° C. and a thermal stability of the liquid crystalline phase ($T_{lc}$) of at least 50° C. The LCN compositions may also exhibit a degree of liquid crystallinity ($\Delta H_{lc}$) of at least 10 J/g. Moreover, when 1,5,7-triazabicyclo[4.4.0]dec-5-ene (TBD) is included as an additional component in the LCN composition, the ester linkages become dynamic, i.e., labile and able to undergo transesterification, which endows the LCN compositions with an additional level of reprocessability and self-healing ability.

In another aspect, the invention is directed to a method of producing the liquid crystalline network composition. In the method, azo-containing aromatic epoxy molecules are cross-linked with alkylene diacid molecules containing at least one methylene unit at a processing temperature of at least 120° C. to 250° C., wherein the azo-containing aromatic epoxy molecules and alkylene diacid molecules are in a molar ratio that results in the liquid crystalline network composition exhibiting a glass transition temperature ($T_g$) of at least 25° C., and the cross-linking includes formation of ester linkages by ring-opening reaction between the epoxy units and alkylene diacids.

In yet another aspect, the invention is directed to a method of light-activated mechanical deformation of the LCN composition described above. In the method, the LCN composition is exposed to electromagnetic radiation having a wavelength of 300-500 nm at an intensity sufficient to result in a bulk physical deformation of the LCN, wherein the physical deformation occurs at least primarily by light-stimulated trans-cis-trans or trans-cis isomeric conversion of the azo groups without thermal decomposition of the LCN composition.

This application discloses a facile and straight-forward route for incorporating three functional building blocks (i.e., azo-aromatic chromophores, liquid crystalline domains, and dynamic covalent bonds) into an epoxy-based liquid crystalline network (LCN), by polymerizing an azo-aromatic epoxy monomer with an aliphatic dicarboxylic acid to create exchangeable ester bonds that can be thermally activated. All three functional aspects are highly compatible, and the resulting materials can exhibit various photomechanical, shape memory, and self-healing properties by virtue of the azo-aromatic molecules, liquid crystalline domains, and dynamic ester bonds, respectively. The unique combinations of thermal transition temperatures and thermomechanical properties, along with light-stimulated shape-changing ability, in the LCN compositions described herein make these compositions particularly suited for use in applications where reversible shape changing and tunable shape memory behavior are particularly useful. Some of these applications include, for example, artificial muscles, sensors, actuators, lithography substrates, mechanical parts, and surgical implants.

BRIEF DESCRIPTION OF THE DRAWINGS

FIG. 1A is a general schematic of the synthetic methodology used and reaction mechanisms involved in producing the LCN compositions; FIG. 1B presents a series of UV-vis absorption spectra of the 4,4'-diglycidyloxyazobenzene (AE) monomer, as depicted in FIG. 1A, at different UV (365 nm) exposure times; FIG. 1C is a depiction of the optical setup used elucidating the photomechanical behavior of the LCN compositions.

FIG. 2A (top) is a photograph showing photomechanical deformation (bending toward the light source) of an LCN film (10 mm×1 mm×15 µm) having the chemical composition shown in FIG. 1A when exposed to polarized blue light at a light intensity of 40 mW/cm$^2$ and with the light polarization parallel to the long axis of the LCN film, while FIG. 2A (bottom) is a photograph showing photomechanical deformation (bending away from the light source) of the LCN film using the same polarized blue light but with the light polarization perpendicular to the long axis of the LCN film; FIG. 2B is a schematic representation of the rearrangements occurring in the LCN film that give rise to the bidirectional bending behavior observed in the LCN film when exposed to polarized blue light oriented either parallel or perpendicular to the long axis of the LCN film; FIG. 2C shows the UV light-induced deformation of the LCN film (10 mm×10 mm×15 µm) at a light intensity of 75.8 mW/cm$^2$; FIG. 2D is a schematic depiction of the bending mechanism resulting from UV irradiation in the LCN film.

FIG. 3A is a graph plotting the static tensile behavior of the LCN film, with indications of a polydomain-monodomain transition; FIG. 3B is a graph plotting the results of cyclic thermomechanical tensile tests of as-prepared and reprocessed LCN film; FIG. 3C is a graph plotting the results of cyclic thermomechanical tensile tests of as-prepared LCNs at different force levels; FIG. 3D shows two-dimensional X-ray scattering patterns of as-prepared (top row) and reprocessed (bottom row) LCN films at different strain levels (from left to right 0%, 100%, 200%, and 400%); FIG. 3E shows electron scattering patterns of as-prepared LCN films at strain levels of 0% (top) and 400% (bottom); FIG. 3F shows energy filtered transmission electron microscopy images of as-prepared LCN films at strain levels of 0% (top) and 400% (bottom) collected using a zero-loss peak in an electron energy loss spectroscopy spectrum; FIG. 3G shows dark field TEM imaging of as-prepared LCN films at strain levels of 0% (top) and 400% (bottom).

FIG. 4A (left) is a photograph of the LCN film taken at room temperature, while FIG. 4A (right) is a photograph of the LCN film taken above $T_{lc}$, wherein, because of a thermally induced LC phase transition that occurs at $T_{lc}$, a change in transparency of the LCN film is apparent when the material is heated above $T_{lc}$; FIG. 4B is a schematic showing the shape programming used and the shape recovery observed in the LCN; FIG. 4C presents a series of time-lapsed photographs showing a thermally induced shape recovery process (unfolding) of the originally folded LCN when undergoing the glass transition at 85° C.; FIG. 4D presents a series of time-lapsed photographs, following the unfolding process in FIG. 4C, showing a thermally induced shape recovery process (assembling into a box) when undergoing the liquid crystalline phase transition at 140° C.; FIG. 4E is a strain vs. time plot quantitatively confirming the triple shape memory ability of the LCNs; FIG. 4F (left) is a photograph of the LCN film taken before UV irradiation, while FIG. 4F (right) is a photograph of the LCN film taken after UV irradiation, wherein the change in transparency evidences a photothermally-induced LC phase transition; FIG. 4G presents a series of time-lapsed photographs showing a photothermally induced shape recovery process (unfolding) of the LCN, as induced by UV light.

FIG. 5A presents a series of photographs showing, from top to bottom, reconnecting originally cut pieces of the LCN by hot-pressing, which is made possible by the transesterification reaction, effected by the presence of the TBD catalyst; FIG. 5B (left) is a photograph showing blue light-induced bending of the reconnected LCN film at a light intensity of 80 mW/cm$^2$ with the blue light polarized parallel to the long axis of the LCN film, while FIG. 5B (right) is a photograph showing blue light-induced bending of the reconnected LCN film with the same blue light polarized perpendicular to the long axis of the LCN film; FIG. 5C presents a series of photographs showing, from top to bottom, reprocessing (recycling) of the LCN film by chopping the film into numerous pieces and hot-pressing the pieces to produce a recycled piece with retention of original properties; FIG. 5D is a strain vs. temperature plot at different axial forces on the reprocessed LCN film, with the results showing reversible shape change upon temperature cycling; FIG. 5E (top) shows an LCN film with scratches in the film before UV irradiation, while FIG. 5E (bottom) shows the LCN film with the scratches substantially diminished after UV irradiation of the film for 15 minutes at an intensity of 242.6 mW/cm$^2$, with the foregoing results confirming the UV-induced self-healing behavior of the LCNs.

DETAILED DESCRIPTION OF THE INVENTION

Figure 1A:
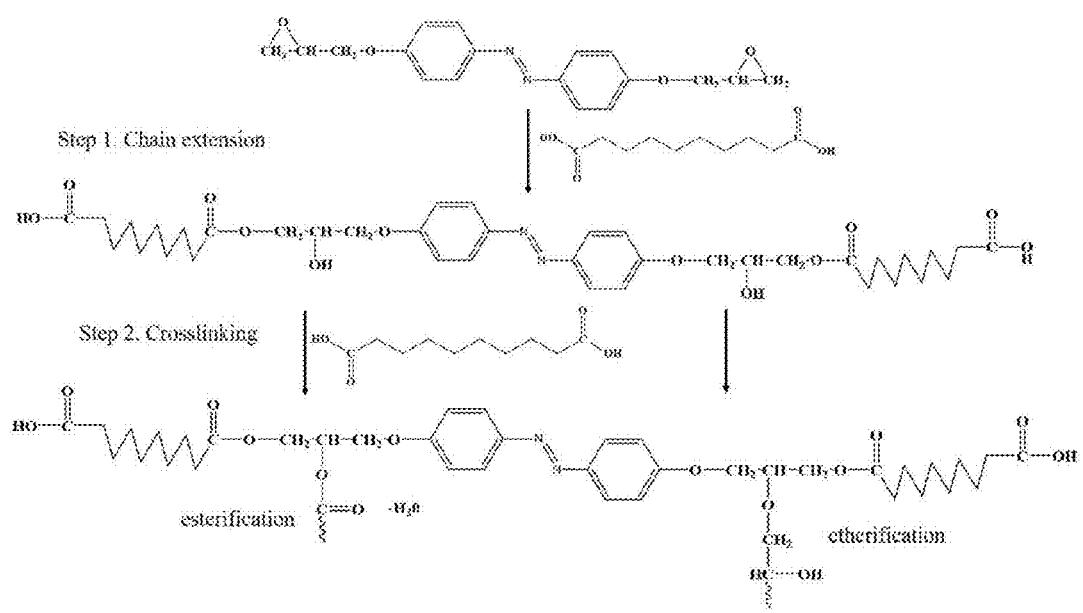
FIGS. 1A-1C.

In one aspect, the invention is directed to liquid crystalline network (LCN) compositions. As well known in the art, the term "liquid crystalline" (i.e., "LC") refers to a state of matter in which a liquid possesses a level of order indicative of a semi-crystalline or crystalline state. The liquid crystalline behavior may be more particularly any of the thermotropic phases known in the art, such as a nematic phase, smectic phase, chiral (cholesteric) phase, or discotic phase. The molecules in a liquid crystalline material exhibit some extent of orientational order between a solid and a liquid, but they generally do not exhibit long-range order. The liquid crystalline state may be achieved either lyotropically (i.e., by varying compositional aspects of the LC) or thermotropically (i.e., by varying temperature). The liquid crystalline network also generally possesses a loosely or weakly cross-linked network of liquid crystal polymers, typically having rigid-rod liquid crystalline molecules incorporated either directly or via a spacer group to the polymer backbone. By virtue of the polymer networks, the LCN possesses both the order of liquid crystals and soft elasticity. The LCN exhibits properties of elastomers (e.g., entropic elasticity) and liquid crystallinity (i.e., self-organization). For a further description of liquid crystalline elastomers (LCEs), reference is made to, e.g., C. Ortiz et al., *Macromolecules,* 31, pp. 8531-8539, 1998; B. T. Michal, et al., *Macromolecules,*

48(10), pp. 3239-3246, 2015; K. A. Burke et al., *J. Mater. Chem.*, 20, pp. 3449-3457, 2010; T. Ikeda et al., *Angew. Chem. Int. Ed. Engl.*, 46(4), pp. 506-528, 2007; and D. Iqbal et al., *Materials*, 6, pp. 116-142, 2013. In some embodiments, the LCN considered herein is a shape-changing polymer (SCP), or more particularly, a shape-memory polymer (SMP), which is a smart material that can recover its original shape from a deformed state under external stimuli, e.g., K. A. Burke et al. (supra), B. T. Michal et al. (supra), and D. Iqbal et al. (supra).

For purposes of the invention, the LCNs considered herein preferably exhibit a glass transition temperature ($T_g$) of at least or above 25° C., 30° C., 35° C., 40° C., 45° C., 50° C., 55° C., 60° C., 65° C., or 70° C., or a $T_g$ within a range bounded by any two of the foregoing values. The glass transition temperature is generally understood as the temperature at which a material transitions from a hard glassy state into a molten state.

The LCNs considered herein may also exhibit a thermal stability of the liquid crystalline phase ($T_{lc}$), also referred to as a phase transition temperature, of at least or above 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., or 150° C., or a $T_{lc}$ within a range bounded by any two of the foregoing values. The LC phase transition ($T_{lc}$) is generally understood as the temperature at which liquid crystals transform from one phase to another with a change of molecular order. This reversible phase transition determines the shape-programming and shape-recovering temperature of a LCN.

The LCNs considered herein may also exhibit a degree of liquid crystallinity ($\Delta H_{lc}$) of at least or above 10, 11, 12, 13, 14, 15, 16, 17, 18, 19, or 20 J/g, or a $\Delta H_{lc}$ within a range bounded by any two of the foregoing values. The $\Delta H_{lc}$ is the enthalpy change involved in the LC phase transition. In the LCNs considered herein, $\Delta H_{lc}$ can be used to estimate the degree of liquid crystallinity of the material because only one LC phase transition, smectic-isotropic, is involved in the LCNs. The degree of liquid crystallinity strongly affects shape memory behavior of the LCNs as both shape-programming and shape-recovering are realized by the rotation of LC domains in the LCNs. In addition, since liquid crystals are generally rigid-rod molecules, they can be regarded as reinforcing fillers in the materials, which has great influence on mechanical properties of the LCNs. Being able to control liquid crystallinity provides a unique way to tailor thermomechanical properties of the LCNs, which in turn affect shape memory behavior of the LCNs.

The LCNs considered herein may also exhibit a storage modulus (E') of up to or less than 1.5, 2, 2.5, 3, or 3.5 MPa at 150° C. or a storage modulus of 1, 1.5, 2, 2.5, or 3 GPa, or within a range therein, at a temperature of −50° C. The E' determines the strength of a material. Shape memory materials with high strength are favored in some applications, such as self-assembling devices that can change shape under load.

The LCNs considered herein may also possess a low coefficient of thermal expansion (CTE). The rigid LC domains in the LCNs restrict motion of polymer chain segments, thereby reducing CTE of the materials. In addition, controlling orientation of the LC domains using external fields provides another way to tailor thermal expansion of the material.

In some embodiments, polysiloxanes and/or polyacrylates are excluded from the LCN composition. As mentioned above, such polymers can be problematic by not exhibiting a reversible phase transition and by having a high cross-link density that obviates reprocessing, reshaping, or repairing of the material. Nevertheless, polysiloxane and/or polyacrylate chemistry may be included if it is integrated into the above-described LCN compositions in such a way that does not substantially adversely affect the ability of the LCN composition to be reprocessed, reshaped, or repaired. Other polymers or additives (e.g., curing agents, or viscosity or hardness modifiers) may be excluded if they adversely impact any of the attributes (as provided) of the LCN compositions that make the LCN compositions particularly suited for the present invention, e.g., retaining the ability of the azo groups to undergo isomerization reversal (or ability to undergo physical deformation, and particularly, reversible physical deformation) upon exposure to electromagnetic radiation, or ability of the LCN to undergo a thermally-induced liquid crystalline phase transition for shape memory applications.

The LCNs having the above-described properties can be conveniently produced by cross-linking azo-containing aromatic epoxy (i.e., epoxidized) molecules with alkylene diacid molecules, wherein the azo group corresponds to —N=N—. Generally, the azo group is connected on each of its ends to an aromatic ring functionalized with one or more epoxy groups, i.e., as $Ar^1$—N=N—$Ar^2$, wherein $Ar^1$ and $Ar^2$ are independently selected from aromatic rings, each of which is functionalized with one or more epoxy groups. The epoxy groups are connected to the aromatic rings either directly, or indirectly via a linker, e.g., as —$(CH_2)_n$— (epoxy ring), where n may be, for example, 1, 2, 3, 4, 5, or 6, and wherein one or more —$CH_2$— groups may be replaced with one or more —O— atoms. The carboxylic acid functional groups in the alkylene diacid molecules react by known ring-opening mechanisms with the epoxy groups in the aromatic epoxy molecules by forming ester linkages. Specifically, a cross-linking reaction occurs in which ester linkages are formed by ring-opening esterification between the aromatic epoxy molecules and alkylene diacid molecules. Once cross-linked, the LCNs possess azo-containing aromatic epoxy units cross-linked (i.e., in ring-opened form) with alkylene diacid units. The initial cross-linking reaction involves ring-opening of the epoxy groups along with esterification to form hydroxy groups on the growing polymer. The newly generated hydroxy groups, in turn, react with the azo-containing aromatic epoxy molecules via further ring opening of epoxy groups on other molecules along with further production of hydroxy groups, which, in turn, can further react with additional epoxy groups or carboxylic acid groups. The growing number of hydroxy groups also further react with the alkylene diacid molecules via esterification. Thus, the cross-linking reaction is quite complex, with an array of various cross-linking reactions. The predominance of one or more types of cross-linking reactions over other cross-linking reactions will substantially determine the properties in the final LCN.

A generalized depiction of the initial cross-linking process is provided as follows:

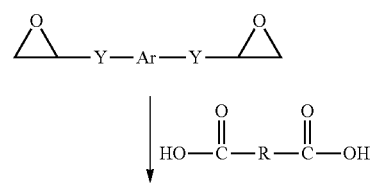

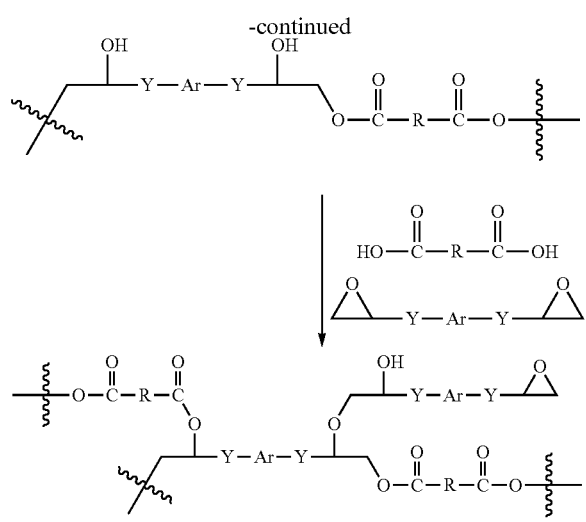

In the above scheme, the wavy lines indicate interconnection with other bonds denoted with the wavy line. The group labeled as Ar in the azo-containing aromatic epoxy molecule corresponds to —$Ar^1$—N═N—$Ar^2$—, wherein $Ar^1$ and $Ar^2$ are independently selected from aromatic rings, with the indicated dashes representing covalent bonds between $Ar^1$ (and separately, between $Ar^2$) and the shown Y groups or directly with the shown epoxy rings in the event Y is a covalent bond. In some embodiments, $Ar^1$ and $Ar^2$ (or all aromatic rings present) are equivalent. In other embodiments, at least $Ar^1$ and $Ar^2$ are not equivalent. More than one azo group may also be present in Ar, such as in the case where Ar represents —$Ar^1$—N═N—$Ar^2$—N═N—$Ar^3$—, in which case $Ar^1$, $Ar^2$, and $Ar^3$ are independently selected from aromatic rings. The Y groups in the aromatic epoxy molecules independently represent covalent bonds or a linking group, such as a —$OCH_2$— group, in which case the epoxy group is bound to the Ar group as a glycidyl group. The Y groups are often the same, but may be different in some embodiments. The Y groups may also be alkylene linkers, such as methylene (—$CH_2$—), dimethylene (—$CH_2CH_2$—), and trimethylene (—$CH_2CH_2CH_2$—) linkers.

As used herein, the term "aromatic ring" refers to one or more aromatic rings, wherein the aromatic ring may be carbocyclic (i.e., without ring heteroatoms, such as phenyl or naphthyl rings) or heteroaromatic (i.e., with ring heteroatoms, such as pyridyl, pyrrolyl, furyl, or thiofuryl rings). Each of the aromatic rings, e.g., $Ar^1$ and/or $Ar^2$, may independently contain one, two, or more aromatic rings. In the case of two or more aromatic rings, the rings may be linked by a covalent bond (e.g., biphenyl) or may be fused (e.g., naphthalene or anthracene). Thus, $Ar^1$ and $Ar^2$ may, in some embodiments, be independently selected from phenyl, biphenyl, or naphthyl. In some cases, the aromatic rings may be fused and also include a covalent bond, as in the case of two naphthalene ring systems connected by a covalent bond. In some embodiments, the azo-containing aromatic epoxy molecules (and resulting units, after cross-linking) possess at least two phenyl rings connected by the azo linkage, e.g., as -Ph-N═N-Ph-, where Ph represents phenyl, and wherein each of the phenyl rings is attached, directly or indirectly, to at least one (i.e., one or more) epoxy groups. In the latter embodiment, one or more of the phenyl rings may or may not be replaced with a biphenyl or naphthyl ring system.

Some examples of azo-containing aromatic epoxy molecules include:

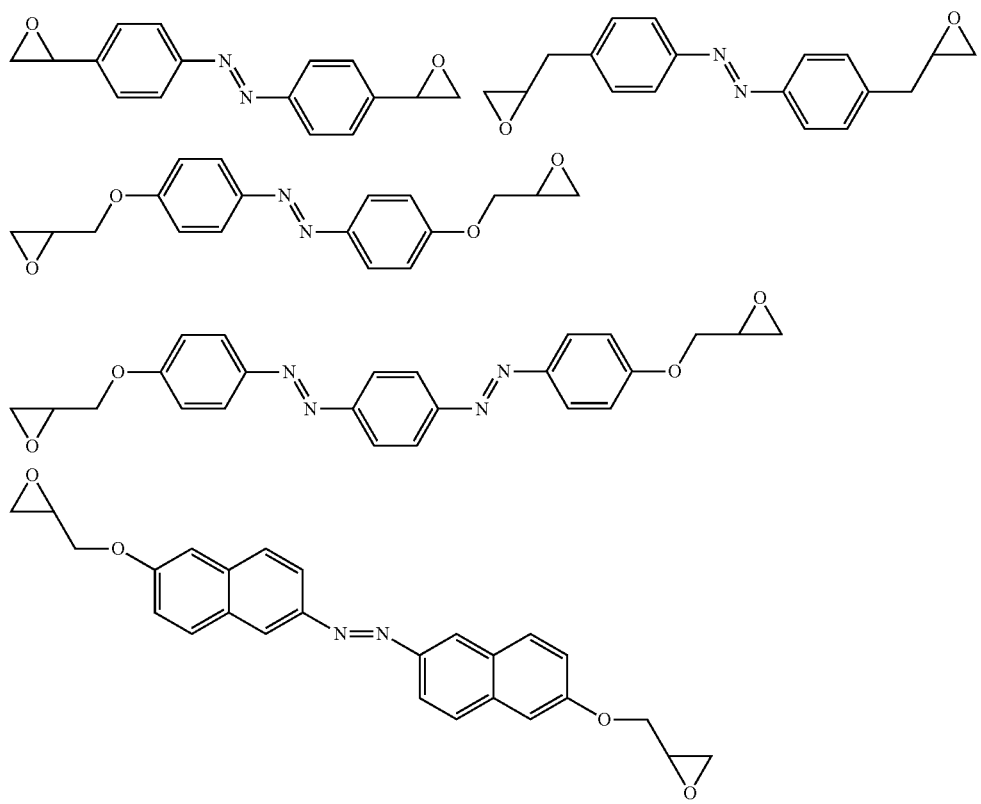

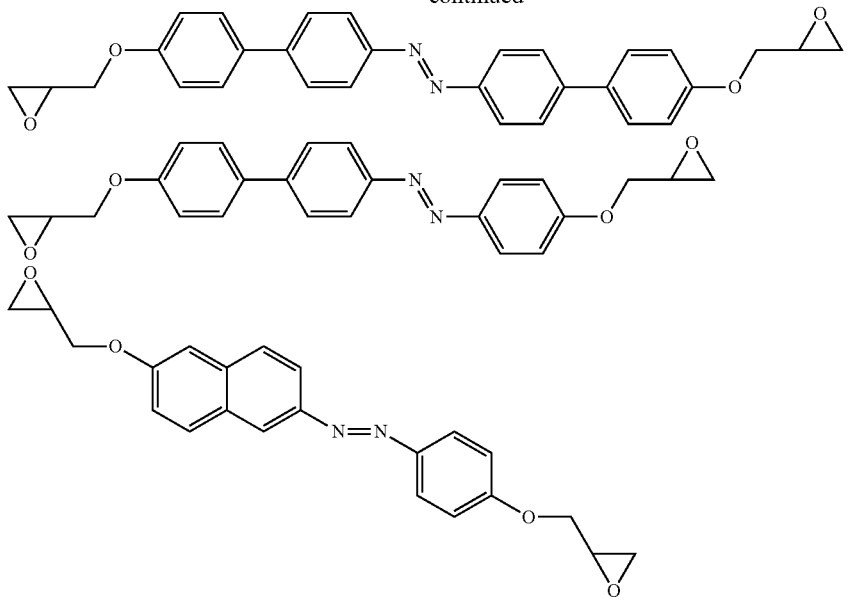

The alkylene diacid molecules possess an alkylene segment containing at least two methylene units along with two carboxylic acid groups as substituents. The alkylene diacid molecule can be conveniently expressed by the following formula:

wherein r is at least 1 to provide for the at least one methylene group —CR'$_2$—. The variable r may be, for example, precisely, at least, or above 1, 2, 3, 4, 5, 6, 7, 8, 9, 10, 11, or 12, or within a range bounded by any two of the foregoing values (e.g., at least 3, 4, 5, 6, or 7 and up to 8, 9, 10, 11, or 12). The R' groups are generally independently selected from H and alkyl and/or alkenyl groups containing 1, 2, or 3 carbon atoms. The term "independently," used above, indicates that R' groups are independently selected within the same methylene group and over different methylene groups. In some embodiments, the R' groups are solely hydrogen atoms, or alternatively, the diacid may include at least one or two methylene groups in which the R' groups are hydrogen atoms. Some examples of alkylene diacid molecules having R' solely as hydrogen atoms include malonic acid, succinic acid, glutaric acid, adipic acid, pimelic acid, suberic acid, azelaic acid, sebacic acid, undecanedioic acid, dodecanedioic acid, tridecanedioic acid, and tetradecanedioic acid. Some examples of alkylene diacid molecules having at least one R' as an alkyl group include 2-methylsuccinic acid, 2,3-dimethylsuccinic acid, and 2-ethyl-2-methylsuccinic acid. In some embodiments, at least one R' group may be a hydroxy group, such as in hydroxybutanedioic acid. In other embodiments, aside from at least one methylene group, the alkylene diacid may include at least one oxo group (C=O), such as in oxobutanedioic acid or oxoglutaric acid. In yet other embodiments, R' groups from adjacent methylene groups may combine as a double bond, such as in fumaric acid, maleic acid, glutaconic acid (pent-2-enedioic acid), traumatic acid (dodec-2-enedioic acid), muconic acid (hexa-2,4-dienedioic acid), citraconic acid (2-methylbut-2-enedioic acid), and mesaconic acid (2-methyl-2-butenedioic acid).

The appropriate conditions under which the aromatic epoxy molecules can be made to cross-link with the alkylene diacid molecules are well known in the art. Typically, an amount of the epoxy molecules and alkylene diacid molecules are rendered in liquid form, either by melting or dissolution in an inert solvent, combined, poured into a mold, and cured at a suitably elevated processing temperature, e.g., 120° C.-250° C., for a suitable amount of time (e.g., 2-12 hours, depending on the temperature) for the curing step to be completed. In different embodiments, the processing temperature may be about, at least, or above, for example, 120° C., 130° C., 140° C., 150° C., 160° C., 170° C., 180° C., 190° C., 200° C., 210° C., 220° C., 230° C., 240° C., or 250° C., or a processing temperature within a range bounded by any two of the foregoing values.

Any suitable molar ratio of epoxy molecules to alkylene diacid molecules may be used. However, for purposes of the invention, the molar ratio used preferably results in an LCN composition having any one or more of the properties described above, particularly in the $T_g$, $T_{lc}$, $\Delta H_{lc}$, and E' characteristics, as described above. In different embodiments, and depending on the type of epoxy molecule and alkylene diacid and other conditions, the molar ratio of epoxy molecules to alkylene diacid molecules may be precisely, at least, above, up to, or less than, for example, 0.1:1, 0.2:1, 0.3:1, 0.4:1, 0.5:1, 0.6:1, 0.7:1, 0.8:1, 0.9:1, 1:1, 1.1:1, 1.2:1, 1.3:1, 1.4:1, 1.5:1, 1.6:1, 1.7:1, 1.8:1, 1.9:1, or 2:1, or the molar ratio may be within a range bounded by any two of the foregoing values. In particular embodiments, the molar ratio is at least or above 0.3:1, 0.4:1, 0.5:1, 0.6:1, or 0.7:1 and up to or less than 0.8:1, 0.9:1, 1:1, 1.1:1, 1.2:1, or 1.5:1.

In some embodiments, the cross-linking (curing) process, described above, is conducted in the presence of a ring-opening and transesterification catalyst (i.e., "catalyst"), such as 1,5,7-triazabicyclo[4.4.0]dec-5-ene (TBD). The catalyst promotes the cross-linking reaction between the azo-containing aromatic epoxy molecules and the alkylene diacid molecules. The catalyst is typically included in an amount of at least 1 mol % of carboxylic acid groups, but may be used in an amount of at least 2, 3, 4, 5, 7, or 10 mol % of carboxylic acid groups, or within an amount between any two of the foregoing values. In some embodiments, the catalyst is permitted to remain as a component in the final liquid crystalline network composition, i.e., after cross-linking. When included in the final composition, the catalyst advantageously permits the ester linkages to become dynamic, i.e., labile (fluxional) and able to undergo trans-esterification, which endows the LCN compositions with an additional level of reprocessability and self-healing ability.

In another aspect, the invention is directed to a method of light-activated mechanical deformation (i.e., shape changing) of the LCN composition. In the method, an azo-containing LCN material, as described above, is exposed to electromagnetic radiation having a wavelength of 300-500 nm at an intensity sufficient to result in a bulk physical deformation (e.g., bending, stretching, or twisting) of the liquid crystalline network. The physical deformation occurs at least primarily (or solely) by light-stimulated trans-cis-trans or trans-cis isomeric conversion of the azo groups without thermal decomposition of the LCN composition. As different wavelengths can induce different isomeric arrangements with resulting different types of mechanical responses, a specific wavelength may be selected in order to elicit a specific type of mechanical response. In different embodiments, the specifically selected wavelength may be 300 nm, 350 nm, 400 nm, 450 nm, or 500 nm, or within a range bounded by any two of the foregoing wavelengths, or within a range in wavelength within ±10%, ±5%, ±2%, or ±1% of the indicated wavelength, or within a range within ±20 nm, ±10 nm, +10 nm, +20 nm, −10 nm, or −20 nm of the indicated wavelength. The term "bulk physical deformation" refers to a deformation that is of such large macroscopic range as to be directly observable with the eye, and generally without the use of a microscope or other instrumentation. Thus, the bulk physical deformation under consideration herein is not limited to mechanical motion that occurs only on a molecular scale, e.g., between molecular segments or microscopic grains, while the outer contours of the bulk material remain visibly static. The intensity sufficient to result in such bulk physical deformation is generally at least 10, 20, 30, 40, or 50 mW/cm$^2$ and up to 60, 70, 80, 90, 100, 150, 200, 250, or 300 mW/cm$^2$, or an intensity within a range bounded by any two of the foregoing values, as long as the intensity is below a level that could cause thermal decomposition. Depending on at least the wavelength and intensity of the light, along with the particular composition of the LCN, the physical deformation can be reversible or permanent. The type of physical deformation can also be dependent on whether the electromagnetic radiation is polarized or unpolarized.

In particular embodiments, the LCN is exposed to electromagnetic radiation having a wavelength in the blue or blue-violet region (e.g., 400-500 nm or 440-495 nm) or a wavelength in the near-ultraviolet or ultraviolet region (e.g., 300-400 nm or 300-360 nm) to elicit a mechanical response, particularly in a layer or film of the LCN. In some embodiments, the LCN is exposed to a polarized wavelength in the blue, blue-violet, near-ultraviolet, or ultraviolet region to induce a bending deformation in the LCN. The polarized electromagnetic radiation is believed to cause the bending response by selectively eliciting a trans-cis-trans or trans-cis reversal in only those azo groups oriented in a direction where the trans-cis-trans or trans-cis reversal can be induced by the polarized electromagnetic radiation while other azo groups oriented in other directions do not undergo a trans-cis-trans or trans-cis reversal. In some embodiments, to induce a bending motion, the intensity of the light is low enough to not penetrate through the entire thickness of the film so as not to induce isomerization reversal throughout the thickness of the film; in this way, the bending motion is accentuated by a difference in tension emanating from cross-linked molecules oriented at the surface of the film by the action of the polarized light vs. cross-linked molecules in the remainder of the film that are not so oriented since the polarized light did not penetrate at that depth. In some embodiments, particularly where the bending response is reversible, the direction or orientation of the bending (e.g., toward or away from the light) of the LCN can be altered by changing the direction of the light polarization relative to a dimensional axis of the LCN film.

In other particular embodiments, the LCN is exposed to electromagnetic radiation having a wavelength in the near-ultraviolet or ultraviolet region (e.g., 300-400 nm or 300-360 nm) and is at an intensity sufficient to result in a thermally-induced liquid crystalline phase transition, wherein the thermally-induced liquid crystalline phase transition occurs as a result of absorption of the electromagnetic radiation by azo groups and subsequent release of thermal energy by the azo groups. Alternatively, the thermally-induced phase transition may be induced by direct application of thermal energy instead of photothermal stimulation. In some embodiments, the thermally-induced liquid crystalline phase transition imparts a shape memory ability to the liquid crystalline network composition. The shape memory behavior can be imparted by, for example, conforming the LCN into a specific shape simultaneous with application of sufficient thermal energy to reach a specific temperature where a liquid crystalline phase transition occurs. An association (i.e., memory) is then established in the LCN material between the specific temperature and the shape of the LCN at the specific temperature. After cooling below the specific temperature and loss of the shape at the specific temperature, reversion back to the specific temperature results in a shape change of the LCN back to the shape at the specific temperature. In other embodiments, the electromagnetic radiation in the near-ultraviolet or ultraviolet region induces self-healing of the LCN to the extent that a physical defect in the LCN is no longer observable.

In another aspect, the invention is directed to methods of additive manufacturing in which any of the above-described LCN compositions is fed into an additive manufacturing device to produce an object made of the LCN composition. In the additive manufacturing process, any of the above-described LCN compositions, which may be in fiber or pellet form (i.e., as an extrudate), is used as a feed material in an additive processing device to produce an object made of the liquid crystalline network. The additive manufacturing process can be any of the additive processes well known in the art, particularly a rapid prototyping unit, such as a fused deposition modeling (FDM), or equivalently, a fused filament fabrication (FFF) device, or more particularly, a 3D printer. As well known in the art, the additive process (particularly FDM or 3D printing process) generally operates by hot extruding a precursor (in this case, the liquid crystalline network) through a die or nozzle of suitable shape, and repeatedly depositing discrete amounts (e.g., beads) of the precursor in designated locations to build a structure. The temperature employed in the additive process is generally a temperature at which the precursor is extrudable but not in a completely melted state, i.e., a temperature below the melting temperature of the polymer. Upon exiting the die (i.e., nozzle) in the additive processing unit, the precursor material cools and solidifies. In the FDM or 3D printing process, the nozzle is moved in precise horizontal and vertical positions as beads of the precursor are deposited. In this way, the additive process can build an object layer by layer using the feed material. The nozzle movements and flow rate are generally controlled by computer software, typically a computer-aided manufacturing (CAM) software package. The FDM or 3D printer builds an object (article) based on instructions provided by a computer program that includes precise specifications of the object to be constructed. The object can have any suitable shape or function, such as, for example, an intelligent implant, where a complex structure is 3D-printed and compressed to a smaller object. After implantation, an external stimuli can be applied to trigger the shape memory behavior so that the object can return to the complex/functional structure. The object may also be, for example, a toy having a complex structure, which may return to an original shape after exposure to a suitable stimulus. By virtue of a shape memory behavior of the object, the object may be flattened for easy transportation and later converted to its intended shape on delivery and exposure to a suitable stimulus. The shape memory aspect of the object may permit the object to be re-assembled. The 3D printing process can incorporate a high degree of complexity, while the shape memory behavior can simplify the structure.

In some embodiments, particularly as part of an additive manufacturing process, the chemical bonding across layers can be obtained and/or enhanced by applying a directional electromagnetic field to the deposited material. In these embodiments, the method controls the crystalline domains of the polymer materials using directional electromagnetic fields to create strong covalent bonding between and/or across layers. Desirably, the directional electromagnetic field is applied to the deposited material before or during cross-linking, such as after partial or full deposition of the material. For example, in one embodiment, a magnetic field directed perpendicular to the plane of the aromatic system induces a ring current in the delocalized pi-electrons of the polymer. The ring current results in reorientation of the aromatic system parallel to the magnetic field. In this way, it is possible to align and cure aromatic epoxy compounds in an oriented nematic or smectic phase by applying a static magnetic field. Notably, the liquid crystalline epoxies cured under a high magnetic field can exhibit a slightly negative glassy CTE. These bulk properties are directly related to the long-range ordering of crystalline domains, essentially forming a texture that aligns with the magnetic field lines.

Examples have been set forth below for the purpose of illustration and to describe certain specific embodiments of the invention. However, the scope of this invention is not to be in any way limited by the examples set forth herein.

EXAMPLES

Synthesis of 4,4'-diglycidyloxyazobenzene (AE), an azo-containing Aromatic EMoxy molecule The azobenzene-based epoxy monomer (AE) was synthesized according to the following general scheme:

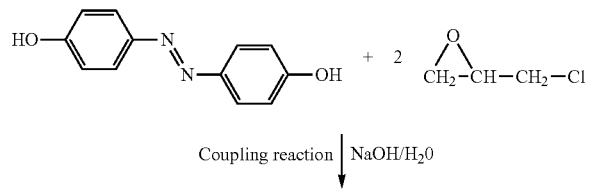

Coupling reaction | NaOH/H₂O

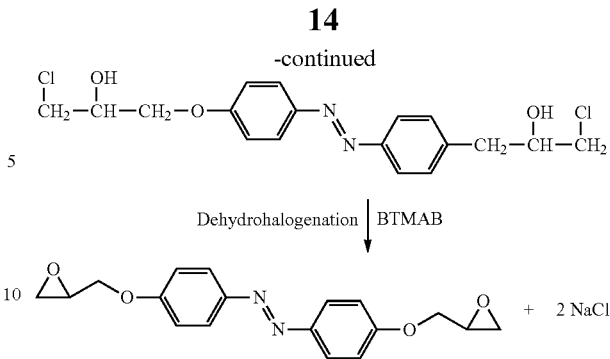

Dehydrohalogenation | BTMAB

In the synthesis, a mixture of 4,4'-(1,2-diazenediyl)bisphenol (10.06 g), BTMAB (0.36 g) and epichlorohydrin (73.64 ml) was placed in a two-neck flask and refluxed for 60 minutes. NaOH (3.76 g) was dissolved in 21.3 mL of water to prepare 15% NaOH aqueous solution. The solution was added into the flask dropwise over a period of 4 hours under reflux. The reaction was conducted for an additional 12 hours at room temperature. The final product was washed with cold methanol and water. A yellow powder was obtained by recrystallization using isopropyl alcohol and chloroform (2:1).

Synthesis of a Cross-Linked Liquid Crystalline Network (LCN)

The synthetic route is generally depicted in FIG. 1A. In the selected method, the azobenzene-based epoxy monomer (AE), produced as above, was polymerized with an aliphatic dicarboxylic acid (specifically, sebacic acid, or SA) to form a cross-linked LCN. A ring-opening/transesterification catalyst (TBD) was incorporated into the system to promote the formation of an LC phase as well as to activate the dynamic ester bonds created by the epoxy-acid reaction. As indicated in FIG. 1A, the reaction between AE and SA involved two major competing reactions, including the ring-opening reaction of the epoxy by carboxylic acid groups and the cross-linking reaction through the hydroxyl groups created by the opened epoxy rings. Provided that AE itself is not liquid crystalline, the ring-opening reaction of AE by SA is crucial for an LC phase formation because the addition of SA increases the mobility of the AE molecules by introducing flexible aliphatic chains and facilitates their self-organization into an ordered LC phase. The use of TBD was equally important to facilitate LC phase formation as it accelerated the ring-opening reaction and prevented extensive cross-linking in the early stage of the curing reaction. LCN samples were synthesized by one-pot curing of the three components, which provided a simple way to prepare LCNs. Fully cured LCNs exhibited a glass transition temperature ($T_g$) of 51° C. and an LC phase transition temperature ($T_{lc}$) of 103° C. A smectic LC polydomain structure was confirmed by both polarized optical microscopy (POM) and two-dimensional small-angle/wide-angle X-ray scattering (2D SAXS/WAXS).

More specifically, the LCNs were synthesized by curing of the azobenzene-based epoxy monomer (4,4'-diglycidyloxyazobenzene, AE) and dicarboxylic acid curing agent (sebacic acid, SA) at an epoxy/carboxylic acid ratio of 1:1. A ring-opening/transesterification catalyst (1,5,7-triazabicyclo[4.4.0]dec-5-ene, TBD) was used at an amount of 5 mol % of carboxylic acid groups. The three chemicals were dissolved in acetone and sonicated for 30 minutes followed by evaporation of the acetone at room temperature. The powder mixture was further ground using a mortar and pestle. LCN films were prepared using the parallel plate fixture of a strain-controlled rheometer. The thickness of the film was controlled by the gap of the parallel plates. The material was cured at 170° C. for 1 hour in the rheometer, then moved to a convection oven, and cured at 200° C. for 3 hours.

Photoresponsive Behavior

As mentioned earlier, the photomechanical behavior of azobenzene functionalized polymers is determined by the conformational change between a planar, rod-like, trans-isomer with a molecular length of 9 Å and a non-planar, bent, cis-isomer with a molecular length of 5.5 Å. This transformation can be controlled by the wavelength of the incident light. Exposure to UV light usually leads to a trans-cis isomerization, resulting in bending of the azobenzene molecules. The use of blue light, on the other hand, usually leads to a trans-cis-trans isomerization, where trans-azobenzene molecules are initially transformed to cis-isomers but return back to the trans-state with a preferred orientation. In addition, the use of linear polarized light allows for selective azobenzene molecules to be exposed to light, enabling precise control of the photomechanical behavior.

Figure 1B:
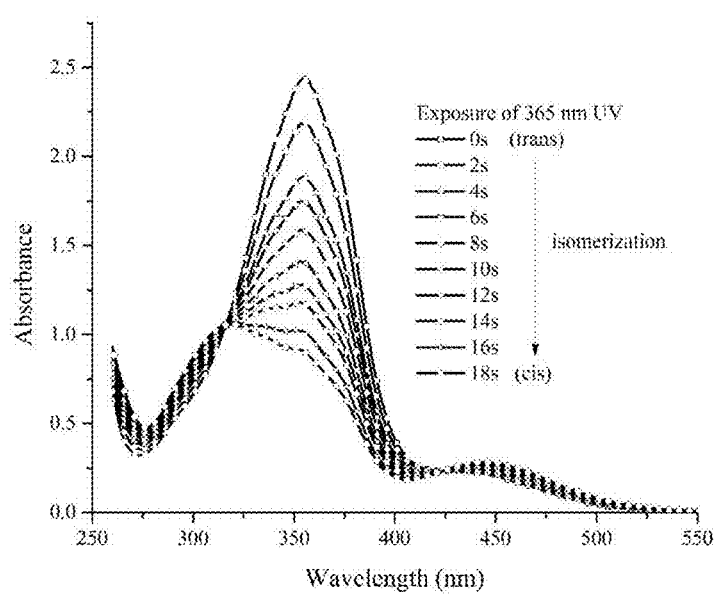

In order to better understand the photoisomerization process, absorption spectra of the synthesized AE monomer were characterized using ultraviolet-visible (UV-vis) spectroscopy, the results of which are shown in FIG. 1B. Prior to UV irradiation, trans-AE was the predominant isomer as indicated by the strong peak at 355 nm caused by the $\pi \rightarrow \pi^*$ absorption band of the trans isomer. As the UV exposure time increased, the intensity of this peak decreased significantly, which indicated a reduction of trans isomers. Meanwhile, a new peak was observed at 444 nm corresponding to the $n \rightarrow \pi^*$ absorption band of the cis isomer. The increase in peak intensity indicated a gradual build-up of cis-AE isomers with UV irradiation. The comparison of absorption spectra of trans isomers and cis isomers shows that, in the blue light region (440 to 495 nm), both isomers exhibited nearly equivalent light absorption, which has been known to promote the trans-cis-trans isomerization of the azobenzene molecules (Lee, K. M., et al., *J. Mater. Chem.* 2012, 22, 691-698).

Figure 1C:
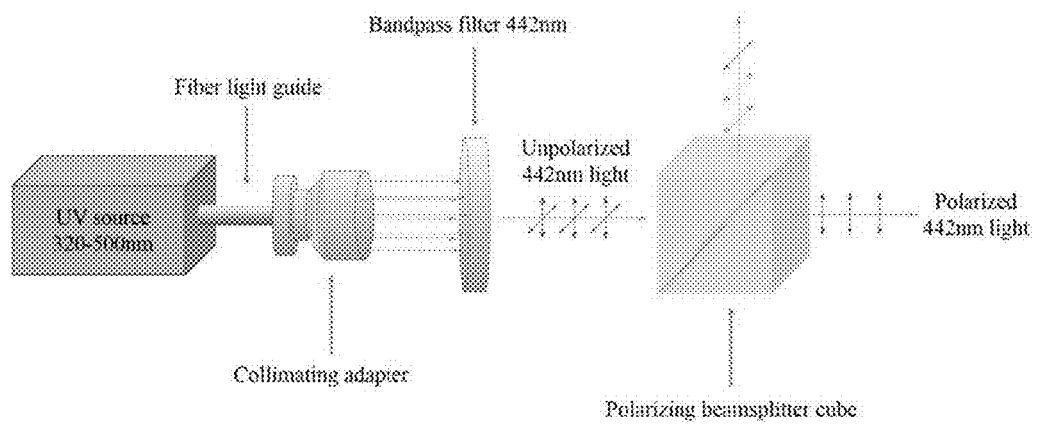
Figure 2A:
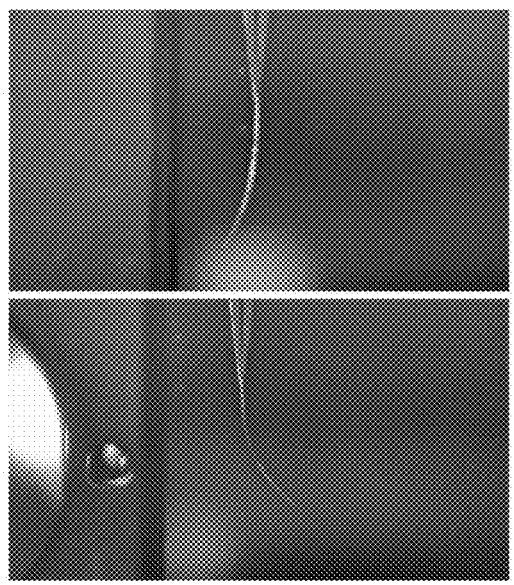
FIGS. 2A-2D.
Figure 2B:
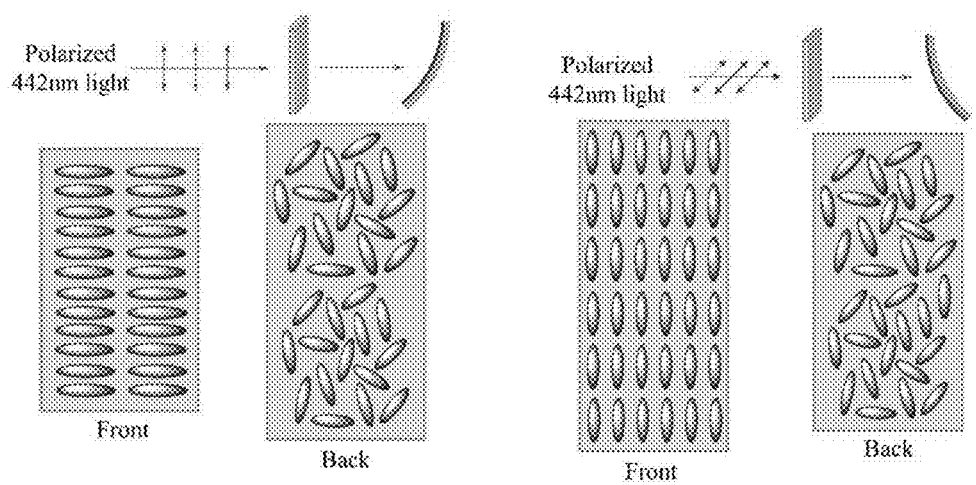

To investigate the photomechanical behavior of the LCNs, an optical system was constructed, as depicted in FIG. 1C. It can produce either polarized blue light at 442 nm or polarized UV light at 355 nm. FIG. 2A shows the blue light-induced deformation of the LCNs. Depending on the polarization direction of the incident light, the LCN film bent either toward or away from the light source. The mechanism of this bidirectional bending behavior is illustrated in FIG. 2B. It has been known that azobenzene molecules can be aligned perpendicularly to a polarized blue light (Gibbons, W. M. et al., *Nature* 1991, 351, 49-50). However, because of the high extinction coefficient of azobenzene molecules, most of the incident photons were absorbed at the top layer of the LCN film, resulting in a reorientation of the azobenzene molecules only on the light-fronting surface (Ikeda, T., et al., *Adv. Mater.* 2003, 15, 201-205). When the direction of polarization (E) was parallel to the long axis (x) of the LCN film, the azobenzene molecules on the light-fronting surface were oriented perpendicular to the polarization direction, leading to a contraction of the LCN film on the surface layer. The rest of the LCN film, however, remained unchanged; this difference caused the bending of the LCN film toward the light source. In contrast, when E and x were perpendicular, the reorientation resulted in an expansion of the LCN film on the light-fronting surface and the net effect was the bending of the LCN film away from the light source. Because of the reversible nature of the trans-cis-trans isomerization process, the direction of a bent LCN film can be altered by changing the direction of the light polarization.

Figure 2C:
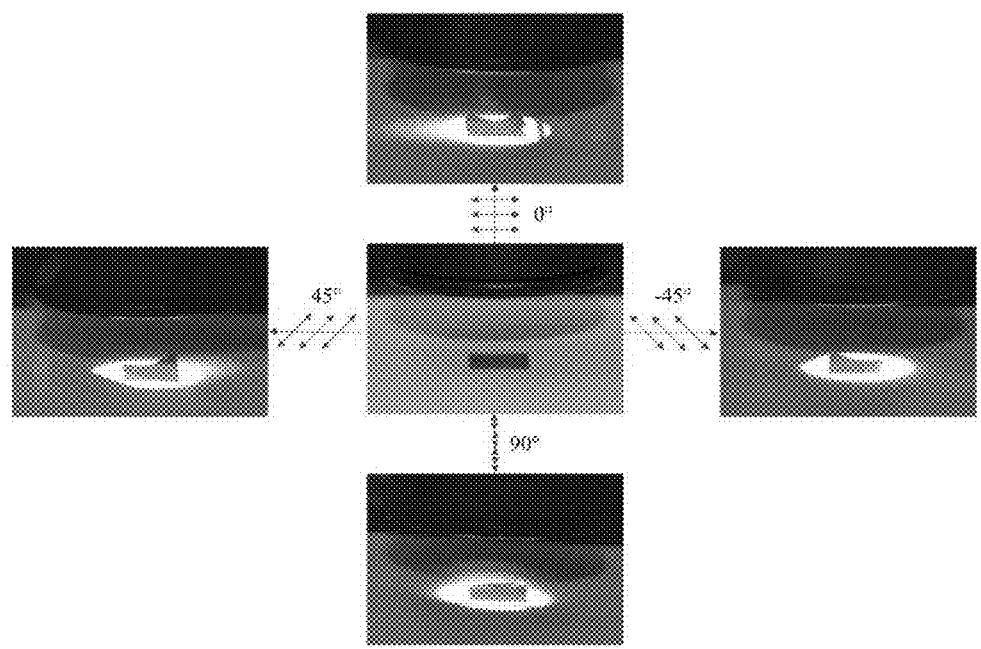
Figure 2D:
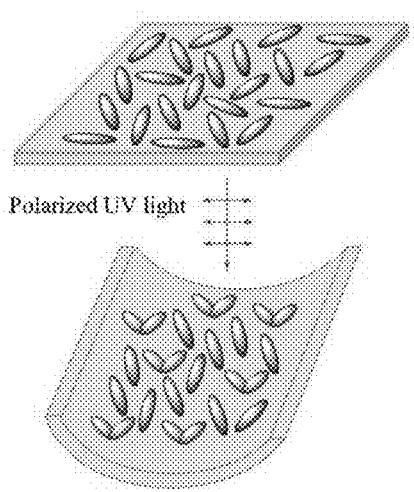

FIG. 2C shows the UV light-induced deformation of the LCNs, and the associated mechanism is depicted in FIG. 2D. The bending direction can be precisely controlled by the polarization direction of the UV light. As shown in FIG. 2D, the use of polarized light resulted in a selective absorption, where only azobenzene molecules parallel to the polarization direction of the UV light were able to absorb light energy and transform to cis isomers. The bending of these molecules resulted in a contraction of the top surface and caused bending of the LCN film in the direction of polarization.

Shape Memory Behavior

Figure 3A:
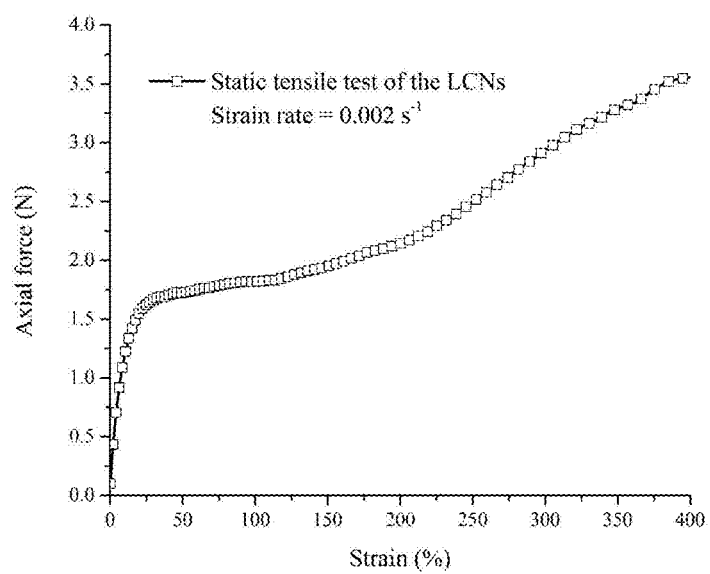
FIGS. 3A-3G.

LCNs are able to exhibit large dimensional changes because of the macroscopic orientation of the LC domains. FIG. 3A shows the static tensile behavior of the investigated LCNs. The force-strain curve exhibited a plateau region, indicating a polydomain-monodomain (P-M) transition of the LC phase, where all the LC domains were rotating and oriented in response to the applied mechanical force. The orientation of the LC domains was confirmed by ex situ 2D SAXS/WAXS experiments, the results of which are shown in FIG. 3D. Electron scattering patterns were collected using transmission electron microscopy (TEM), and the results are shown in FIG. 3E. For unstretched LCN film, two concentric rings were observed from the scattering pattern, which indicates the presence of a smectic LC phase. The inner, sharp ring (q=3.8 nm-1, d=16.3 Å) was a result of the scattering from the periodic layers of the smectic structure. The outer, diffuse scattering ring (q=14.3 nm-1, d=4.4 Å) was attributed to the scattering of neighboring mesogens in the smectic layers. Upon mechanical stretching, the inner and outer rings split into two pairs of scattering arcs with non-uniform intensity distribution in the meridional and equatorial direction, respectively, which indicates that the LC domains were aligned along the direction of the mechanical stretching. The degree of orientation of the LCNs increased significantly during the P-M transition, as indicated by an observed change in the azimuthal intensity distribution of 2D SAXS/WAXS patterns.

The morphology of the oriented LC domains was further investigated using electron energy loss spectroscopy (EELS) and energy filtered TEM (EFTEM). FIG. 3F shows the EFTEM images of as-prepared LCN films at strain levels of 0% (top) and 400% (bottom) collected using zero-loss peak in the EELS spectrum. The contrast between LC and amorphous domains increased significantly after mechanical stretching. A similar behavior was also observed using a dark field TEM imaging technique, the results of which are shown in FIG. 3G.

Figure 3B:
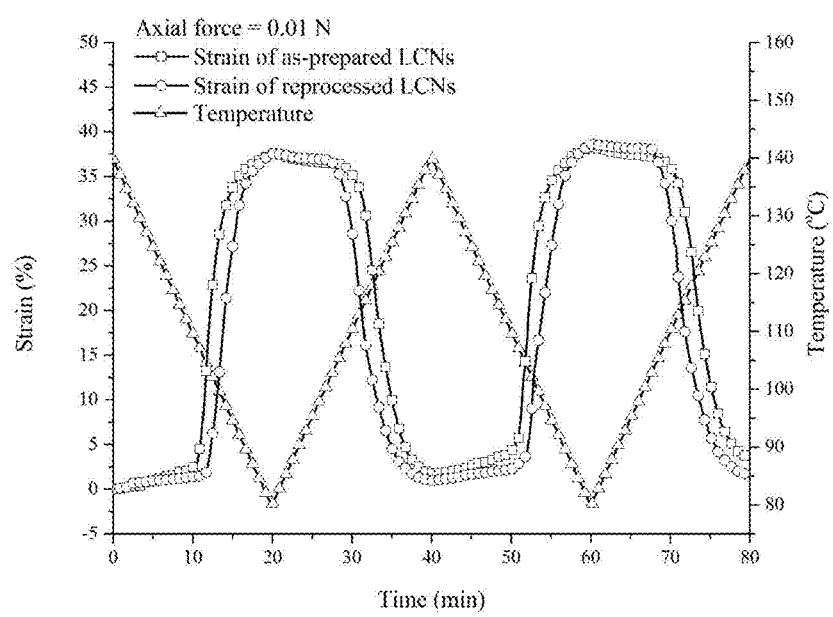
Figure 3C:
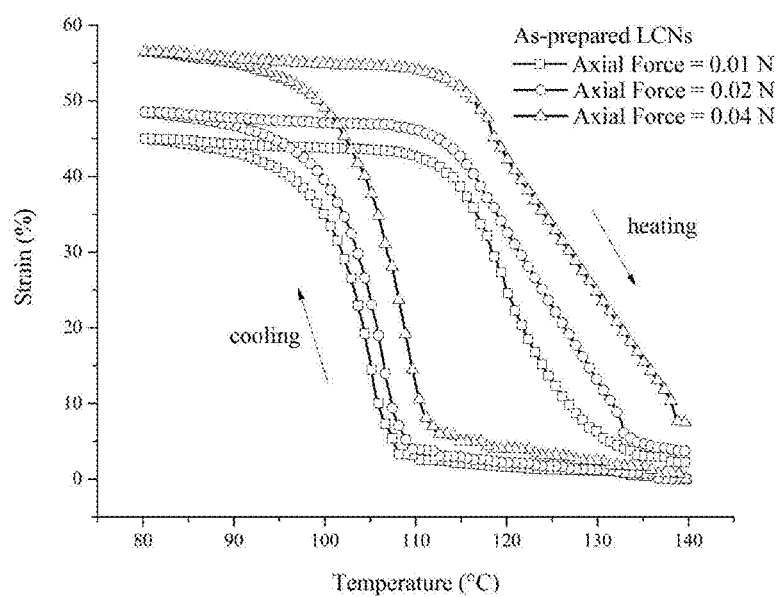
Figure 3D:
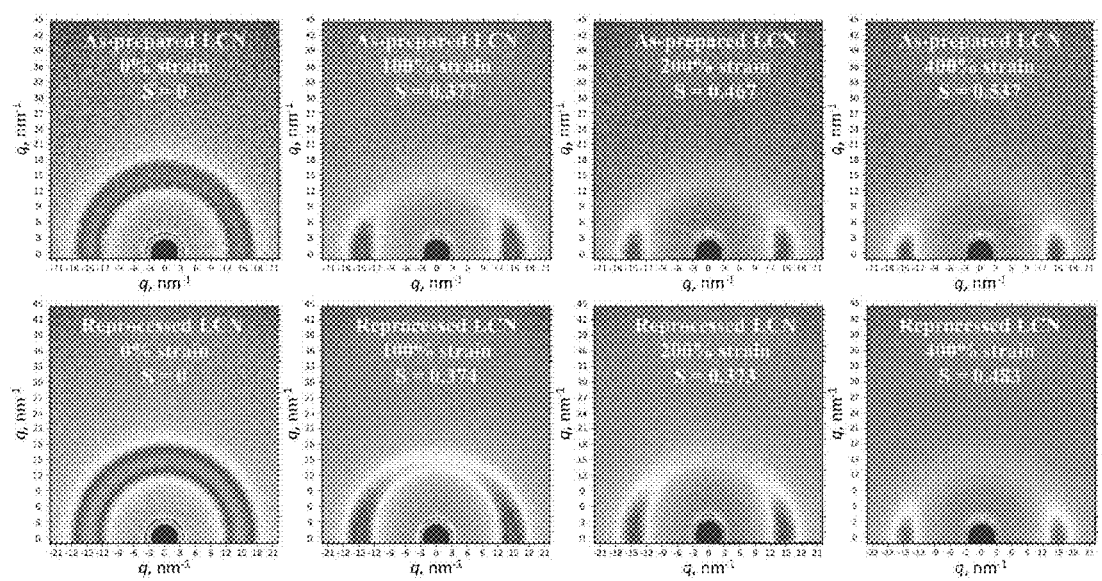
Figure 3E:
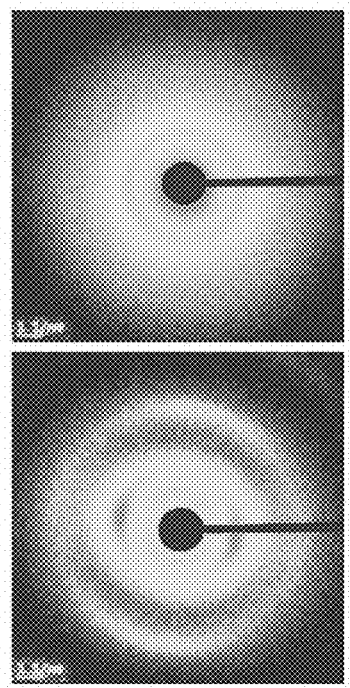
Figure 3F:
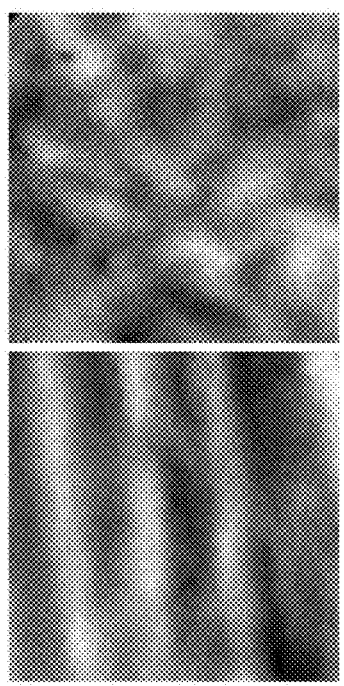
Figure 3G:
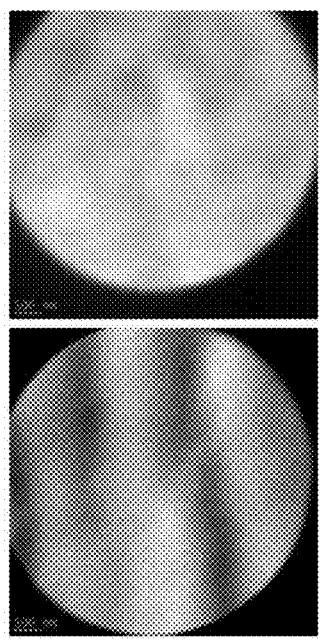

Using the reversible order-disorder transition, the reversible shape change of the LCNs was characterized by cyclic thermomechanical tensile tests, the results of which are shown in FIG. 3B. In the experiment, the LCN film was heated to 140° C. (above $T_{Ic}$), and then, a constant force of 0.01 N was applied. Then, the temperature was decreased to 80° C. at a cooling rate of 1° C./min and then increased to 140° C. again at a heating rate of 1° C./min. The strain of the LCN film was measured during the temperature cycling. The strain of the LCN increased during the cooling process, which was attributed to the formation and orientation of the LC domains. During the heating process, however, the strain deceased, which indicates a contraction of the LCN film caused by the smectic-isotropic phase transition of the LC domains. Because of the reversible nature of the LC phase transition, this reversible shape change can be repeated several times. Cyclic thermomechanical tensile tests were also performed at different force levels to investigate the sensitivity of the LCNs to the applied force. Three stress levels were examined, and the results are shown in FIG. 3C. Generally, the maximum strain of the LCN increased with the increasing mechanical force, which was attributed to a higher degree of orientation of the LC domain. However, when tested under an axial force of 0.04 N, the shape change of the LCN could not be fully recovered, which indicates slippage of polymer chains in the network.

Figure 4A:
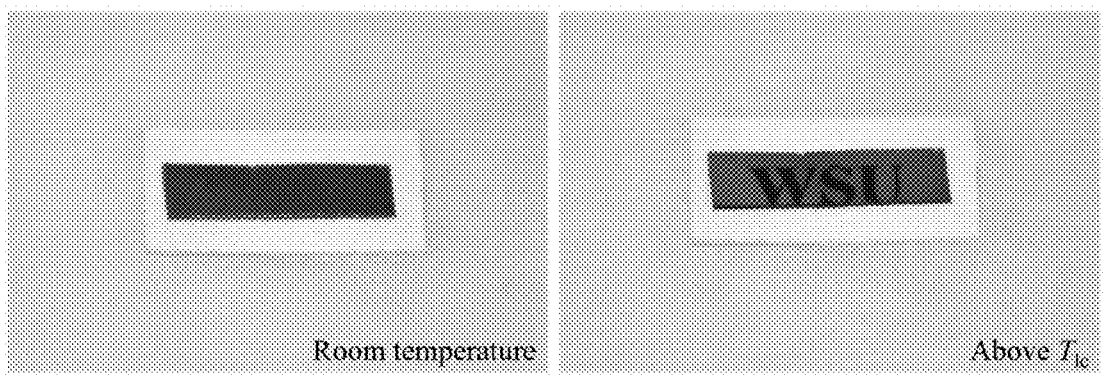
FIGS. 4A-4G.
Figure 4B:
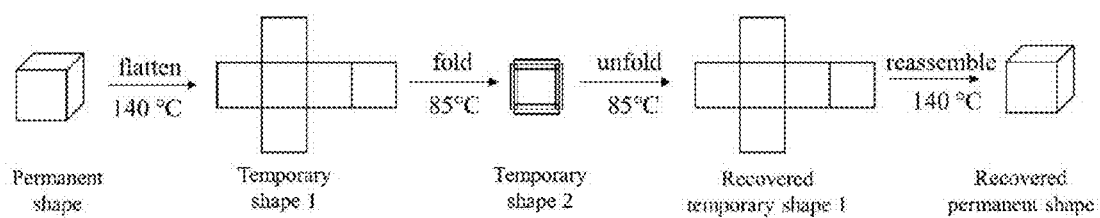
Figure 4C:
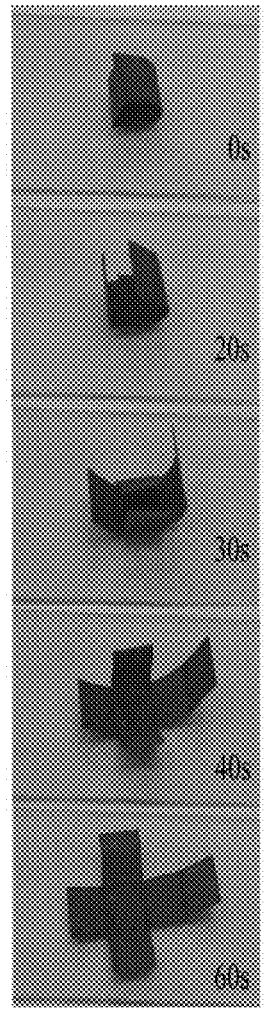

Taking advantage of the reversible nature of the LC phase transition, the LC domains can be used as switching segments for shape memory applications. FIG. 4A illustrates a thermally induced LC phase transition (photograph taken at room temperature, left; and photograph taken above $T_{lc}$, right) as evidenced in the change in transparency of the LCN film when the material was heated above $T_{lc}$. The two reversible transitions of the LCNs ($T_g$ and $T_{lc}$) allowed for the design of a material with triple shape memory behavior; as depicted in FIG. 4B. For triple shape memory polymers, the permanent shape of the material is determined by the chemical cross-links of the network, whereas two temporary shapes can be remembered through different switching domains which act as physical cross-links to fix the deformed shapes (Behl, M.; Lendlein, A., *J. Mater. Chem.* 2010, 20, 3335-3345). To demonstrate the triple shape memory behavior of the LCN, an LCN box was heated to 140° C. to remove the LC phase. Then, the material was flattened upon cooling to 85° C. to adopt a first temporary shape. This shape could be retained at 85° C. because of the restriction of the LC domains formed upon cooling. The material was then folded at 85° C. to adopt a second temporary shape and cooled to room temperature. The first shape recovery process (unfolding) was achieved when the material was heated back to 85° C. and became an LC rubber, as demonstrated in the time-lapsed series of photographs provided in FIG. 4C. Following the first shape recovery, the second shape recovery process (reassembling) was achieved at 140° C., when the material became an amorphous rubber when the restriction of the LC phase was removed, as demonstrated in the time-lapsed series of photographs provided in FIG. 4D. A quantified triple shape memory experiment is also demonstrated in the strain vs. time graph in FIG. 4E. Notably, compared to the glass transition, the LC phase transition is more suitable for shape memory applications due to the large dimensional change caused by the LC orientation and their sensitivity to small forces.

Figure 4D:
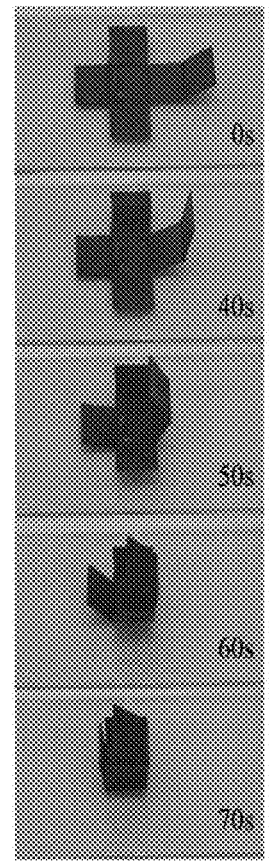
Figure 4E:
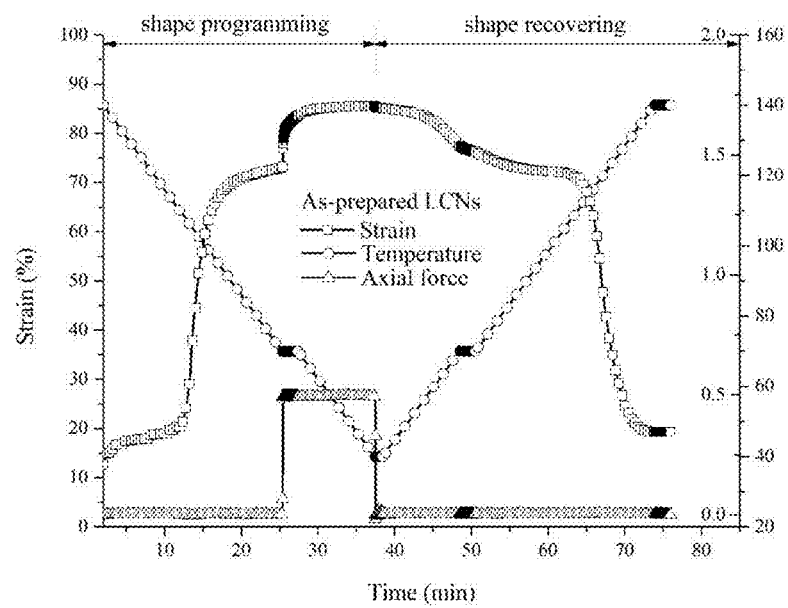
Figure 4F:
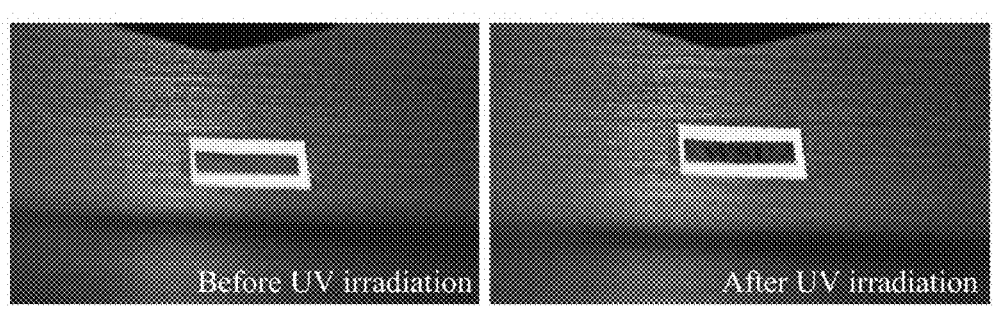
Figure 4G:
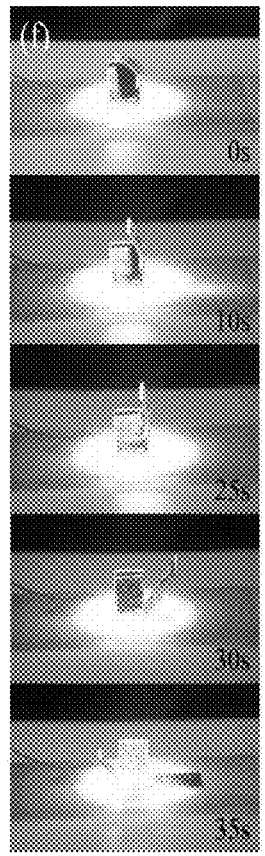
Figure 4H:
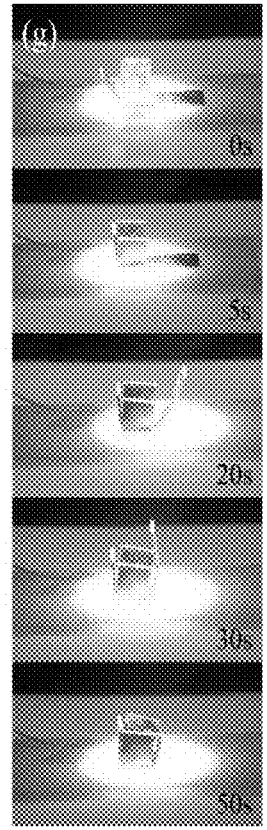
FIG. 4H presents a series of time-lapsed photographs, following the unfolding process in FIG. 4G, showing a photothermally induced shape recovery process (assembling into a box) of the LCN, as induced by UV light.

The LC phase transition can also be induced by UV irradiation, as shown in FIG. 4F. FIG. 4F illustrates a photothermally-induced LC phase transition (photograph taken before UV irradiation, left; and photograph after UV irradiation, right) as evidenced in the change in transparency of the LCN film. Here, the LC phase transition was primarily a result of a photothermal effect rather than the photochemical effect responsible for the trans-cis isomerization observed in the case of bending behaviors. In the photothermal effect, the UV light becomes strongly absorbed by the azobenzene molecules and is converted to thermal energy, which induces the LC phase transition. A UV-induced triple shape memory behavior of the LCNs was observed. FIGS. 4G and 4H each provide a time-lapsed series of photographs demonstrating the consecutive shape recovery processes (i.e., unfolding and reassembling, respectively) of the LCNs as a result of the UV-induced photothermal treatment. Compared to thermally induced shape memory, the use of light offers multiple levels of control, i.e., via wavelength, intensity, position, and polarization. The strong photothermal response of the material can also be used for other applications, such as self-healing and stress relaxation.

Reprocessability

Although the known LCNs offer remarkable properties, their practical applications are limited in part because of the difficulties in reprocessing of the materials. The introduction of dynamic ester bonds into epoxy or LC epoxy systems that are based on transesterification between ester and hydroxyl groups has herein resulted in thermosetting materials that are remoldable and mendable. The exchange reaction can be thermally activated at the topology freezing transition temperature ($T_v$), e.g., Montarnal, D., et al., *Science*, 2011, 334, 965-968. At temperatures below $T_v$, the exchange reaction is extremely slow so that the material exhibits a fixed topology and behaves like a permanently cross-linked thermoset, while at temperatures above $T_v$, the ester bonds undergo fast breaking and reforming, thereby allowing for the rearrangement of the thermoset's topology. This unique property was introduced to the LCNs under investigation by including epoxy groups on the azobenzene molecules. The reaction between epoxy and acid groups creates ester and newly formed hydroxyl groups that are exchangeable under the influence of the transesterification catalyst (TBD). The transesterification initiation temperature was determined by subjecting the LCN film to a temperature ramp under a uniaxial tensile force of 0.1 N. The LCN film started to exhibit large dimensional changes at 150° C., which indicates a fast breaking and reforming of the ester bonds.

Figure 5A:
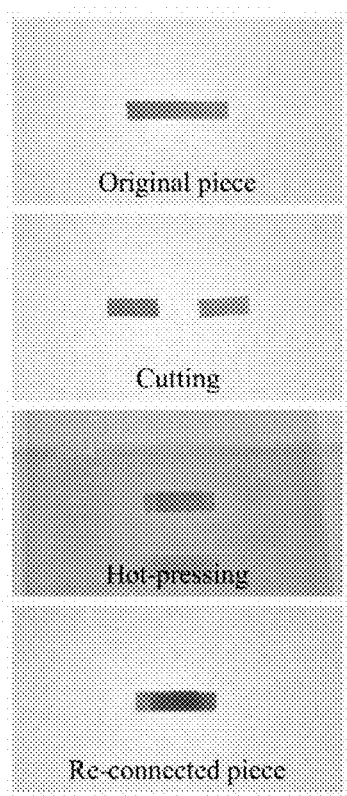
FIGS. 5A-5E.
Figure 5B:
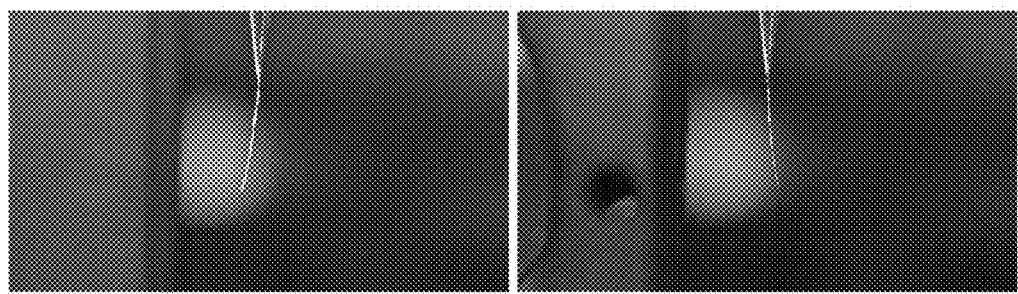

The rate of transesterification was also evaluated using cyclic thermomechanical compression tests. When the temperature was cycled between 40° C. and 150° C., the LCN exhibited an increase in permanent deformation of about 1.55 µm per cycle. However, this value increased to 7.97 µm when the temperature was cycled between 40° C. and 200° C., which suggests a higher rate of transesterification at higher temperatures. FIG. 5A demonstrates an application of this unique functionality. FIG. 5A provides a time-wise succession of photographs showing the thermally induced healing of broken LCN films by hot-pressing a cut film of the LCN at 200° C. for 2 hours. Significantly, the healed (reconnected) LCN film retained the blue light-induced bending behavior, as shown in the photographs in FIG. 5B.

Figure 5C:
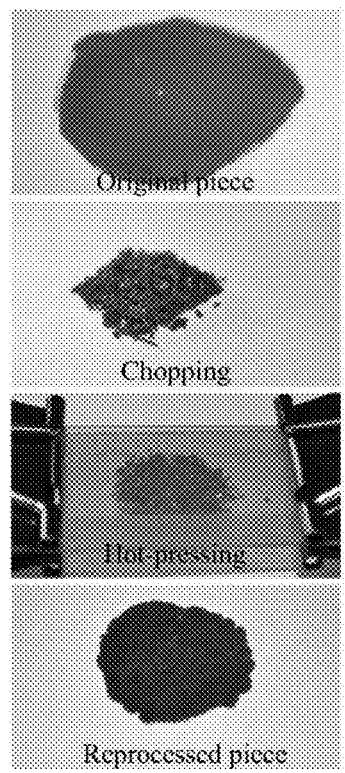
Figure 5D:
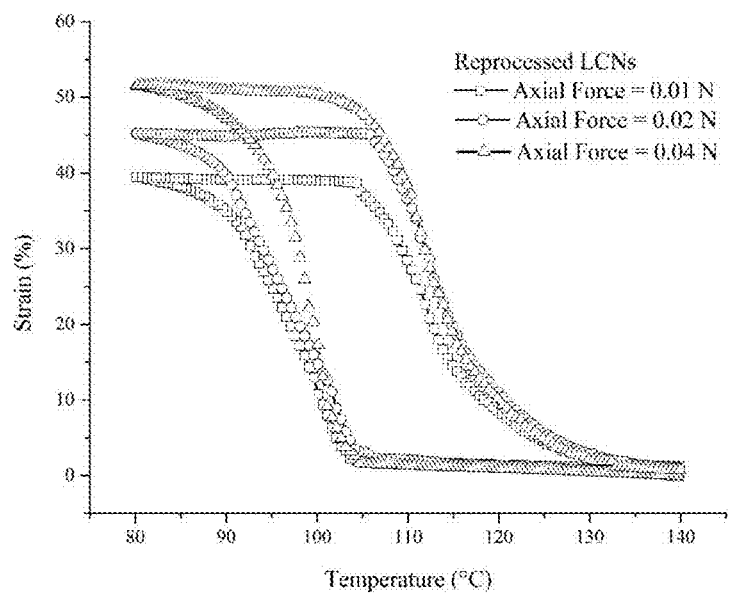
Figure 5E:
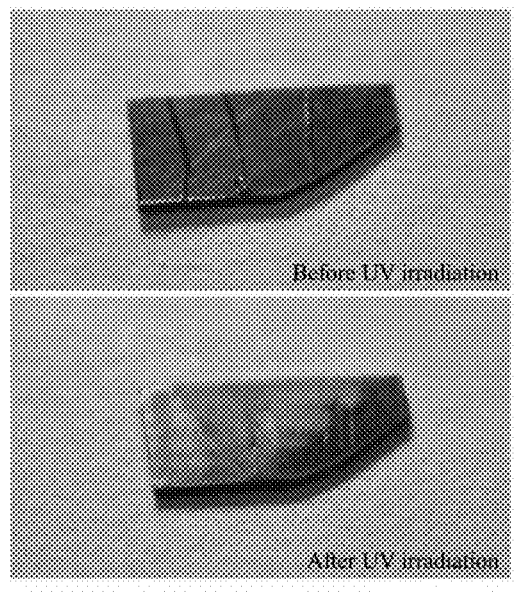

Reprocessability of the LCNs was also investigated, where as-prepared LCN film was chopped into small pieces and hot-pressed at 200° C. for 4 hours, as demonstrated by the time-wise succession of photographs shown in FIG. 5C. The reprocessed LCN film exhibited thermal, liquid crystalline, and thermomechanical properties similar to those of as-prepared LCN film. The reversible shape change upon temperature cycling was characterized, with the results shown in the strain vs. temperature plot in FIG. 5D (and also in FIG. 3B). An initially flat LCN film was remolded to form an LCN box, as shown in FIG. 4D. In addition, the photothermal properties of the LCNs allowed for the activation of dynamic ester bonds using UV irradiation, which provided a unique and more efficient way of reprocessing the material. FIG. 5E provides a set of photographs confirming the UV-induced self-healing behavior of the LCNs. As shown, scratches in the film shown in the photograph in FIG. 5E (top), before UV irradiation, were significantly diminished after UV irradiation of the film for 15 minutes at an intensity of 242.6 mW/cm$^2$, as shown in the photograph in FIG. 5E (bottom).

While there have been shown and described what are at present considered the preferred embodiments of the invention, those skilled in the art may make various changes and modifications which remain within the scope of the invention defined by the appended claims.

What is claimed is:

1. A liquid crystalline network composition comprising azo-containing aromatic epoxy units cross-linked with alkylene diacid units having alkylene segments containing at least one methylene unit, wherein the azo-containing aromatic epoxy units and alkylene diacid units are connected by ester linkages resulting from ring-opening esterification between the epoxy units and alkylene diacids, and wherein the azo-containing aromatic epoxy units and alkylene diacid units are in a molar ratio that results in the liquid crystalline network composition exhibiting a glass transition temperature ($T_g$) of at least 25° C.

2. The composition of claim 1, wherein the liquid crystalline network composition possesses a thermal stability of the liquid crystalline phase ($T_{lc}$) of at least 50° C.

3. The composition of claim 1, wherein said azo-containing aromatic epoxy units possess at least two phenyl rings connected by an azo (—N═N—) linking group, and each of said at least two phenyl rings is connected directly, or indirectly via a linker, to at least one epoxy group.

4. The composition of claim 1, wherein said alkylene diacid units have alkylene segments containing at least three methylene units.

5. The composition of claim 1, wherein said alkylene diacid units have alkylene segments containing at least four methylene units.

6. The composition of claim 1, wherein said alkylene diacid units have alkylene segments containing at least five methylene units.

7. The composition of claim 1, wherein said molar ratio is a molar ratio of azo-containing aromatic epoxy units to alkylene diacid units of 0.5:1 to 1.5:1.

8. The composition of claim 1, wherein said $T_g$ is at least 30° C. and up to 70° C.

9. The composition of claim 1, wherein said liquid crystalline network composition further comprises 1,5,7-triazabicyclo[4.4.0]dec-5-ene.

10. A method of producing a liquid crystalline network composition, the method comprising cross-linking azo-containing aromatic epoxy molecules with alkylene diacid molecules containing at least one methylene unit at a processing temperature of at least 120° C. to 250° C., wherein the azo-containing aromatic epoxy molecules and alkylene diacid molecules are in a molar ratio that results in the liquid crystalline network composition exhibiting a glass transition temperature ($T_g$) of at least 25° C., and said cross-linking comprises formation of ester linkages by ring-opening esterification between the epoxy units and alkylene diacids.

11. The method of claim 10, wherein the liquid crystalline network composition possesses a thermal stability of the liquid crystalline phase ($T_{lc}$) of at least 50° C.

12. The method of claim 10, wherein said azo-containing aromatic epoxy molecules possess at least two phenyl rings connected by an azo (—N═N—) linking group, and each of said at least two phenyl rings is connected directly, or indirectly via a linker, to at least one epoxy group.

13. The method of claim 10, wherein said alkylene diacid molecules have alkylene segments containing at least three methylene units.

14. The method of claim 10, wherein said alkylene diacid molecules have alkylene segments containing at least four methylene units.

15. The method of claim 10, wherein said alkylene diacid molecules have alkylene segments containing at least five methylene units.

16. The method of claim 10, wherein said molar ratio is a molar ratio of azo-containing aromatic epoxy molecules to alkylene diacid molecules of 0.5:1 to 1.5:1.

17. The method of claim 10, wherein said $T_g$ is at least 30° C. and up to 70° C.

18. The method of claim 10, wherein said azo-containing aromatic epoxy molecules and alkylene diacid molecules are cross-linked in the presence of 1,5,7-triazabicyclo[4.4.0]dec-5-ene as a ring-opening and transesterification catalyst, and the resulting liquid crystalline network composition further comprises 1,5,7-triazabicyclo[4.4.0]dec-5-ene.

19. A method of light-activated mechanical deformation of a liquid crystalline network composition, the method comprising:
providing a liquid crystalline network composition comprising azo-containing aromatic epoxy units cross-linked with alkylene diacid units having alkylene segments containing at least one methylene unit, wherein the azo-containing aromatic epoxy units and alkylene diacid units are connected by ester linkages resulting from ring-opening esterification between the epoxy units and alkylene diacids, and wherein the azo-containing aromatic epoxy units and alkylene diacid units are in a molar ratio that results in the liquid crystalline network composition exhibiting a glass transition temperature ($T_g$) of at least 25° C.; and
exposing said liquid crystalline network composition to electromagnetic radiation having a wavelength of 300-500 nm at an intensity sufficient to result in a bulk physical deformation of the liquid crystalline network, wherein said physical deformation occurs at least primarily by light-stimulated trans-cis-trans or trans-cis isomeric conversion of the azo groups without thermal decomposition of the liquid crystalline network composition.

20. The method of claim 19, wherein said bulk physical deformation is reversible.

21. The method of claim 19, wherein said bulk physical deformation comprises bending of the liquid crystalline network composition.

22. The method of claim 19, wherein said electromagnetic radiation is polarized, and the polarized electromagnetic radiation selectively elicits a trans-cis-trans or trans-cis reversal in only those azo groups oriented in a direction where said trans-cis-trans or trans-cis reversal can be effected by the polarized electromagnetic radiation while other azo groups oriented in other directions do not undergo a trans-cis-trans or trans-cis reversal.

23. The method of claim 19, wherein said electromagnetic radiation has a wavelength of 300-400 nm and is at an intensity sufficient to result in a thermally-induced liquid crystalline phase transition, wherein said thermally-induced liquid crystalline phase transition occurs as a result of absorption of said electromagnetic radiation by azo groups and subsequent release of thermal energy by said azo groups.

24. The method of claim 23, wherein said thermally-induced liquid crystalline phase transition imparts a shape memory ability to the liquid crystalline network composition.

25. The method of claim 23, wherein said liquid crystalline network composition contains a physical defect, and said electromagnetic radiation induces self-healing of the liquid crystalline network composition to the extent that said physical defect is no longer observable.

26. The method of claim 19, wherein said azo-containing aromatic epoxy units possess at least two phenyl rings connected by an azo (—N═N—) linking group, and each of said at least two phenyl rings is connected directly, or indirectly via a linker, to at least one epoxy group.

27. The method of claim 19, wherein said alkylene diacid units have alkylene segments containing at least three methylene units.

28. The method of claim 19, wherein said alkylene diacid units have alkylene segments containing at least four methylene units.

29. The method of claim 19, wherein said alkylene diacid units have alkylene segments containing at least five methylene units.

30. The method of claim 19, wherein said liquid crystalline network composition further comprises 1,5,7-triazabicyclo[4.4.0]dec-5-ene.

* * * * *